United States Statutory Invention Registration [19]

[11] Reg. Number: H979

Kelley

[43] Published: Nov. 5, 1991

[54] COCKPIT VISION AND PROTECTION APPARATUS

[75] Inventor: Malcolm E. Kelley, Yellow Springs, Ohio

[73] Assignee: The United States of America as represented by the Secretary of the Air Force, Washington, D.C.

[21] Appl. No.: 548,466

[22] Filed: Jul. 2, 1990

[51] Int. Cl.[5] ..... B64C 1/14

[52] U.S. Cl. ..... 244/129.3; 244/121

[56] References Cited

U.S. PATENT DOCUMENTS

| | | | |
|---|---|---|---|
| 3,331,570 | 6/1965 | Kinnerley et al. | 244/121 |
| 3,334,846 | 11/1964 | Spivak et al. | 244/121 |
| 3,618,881 | 7/1969 | Fellers | 244/121 |
| 4,299,361 | 11/1981 | Webb | 244/224 |
| 4,645,146 | 2/1987 | Hall | 244/129 |
| 4,650,137 | 3/1987 | Guill | 244/121 |

*Primary Examiner*—J. W. Eldred

*Attorney, Agent, or Firm*—Donald J. Singer; Gerald B. Hollins

[57] ABSTRACT

An aircraft windshield system which employs a relatively thin outer windshield member in combination with a thicker ballistic protection inner windshield member and a plurality of electively disposable specific threat protecting panel members is disclosed. The specific threat protecting panel members are arranged for storage during normal peacetime use of the aircraft, and for rapid and selective deployment into protecting positions when elected by the aircrew or as determined by a mission knowledgeable computer apparatus or other means. The results of studies indicating the desirability of multiple-panel windshield structures from both cost and performance viewpoints are also disclosed. The disclosed windshield system is especially applicable to future military aircraft such as the Advanced Tactical Fighter (ATF) and Advanced Tactical Bomber, and may also be retrofitted to existing aircraft for upgrading purposes.

12 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

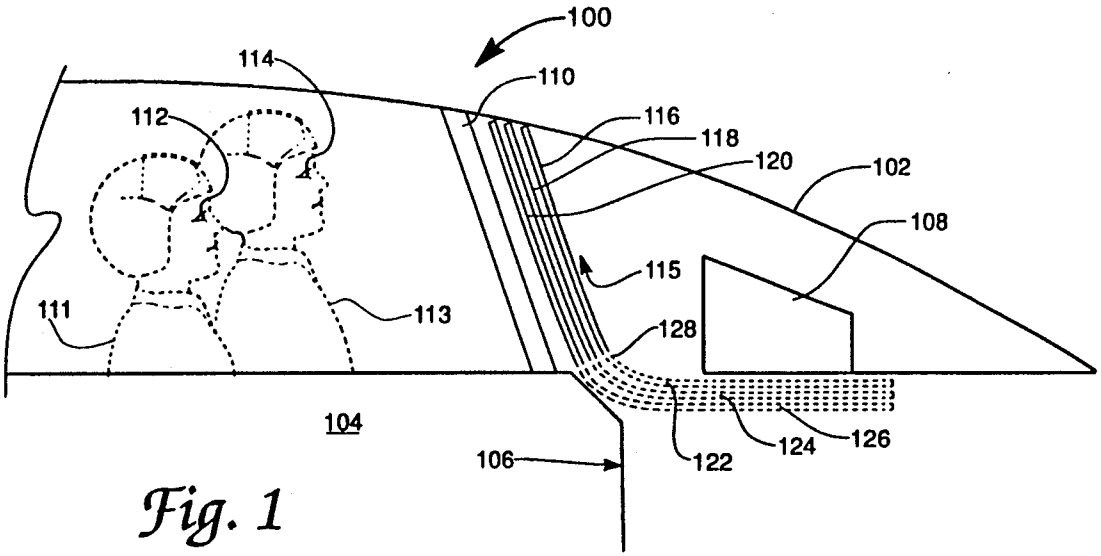
Fig. 1
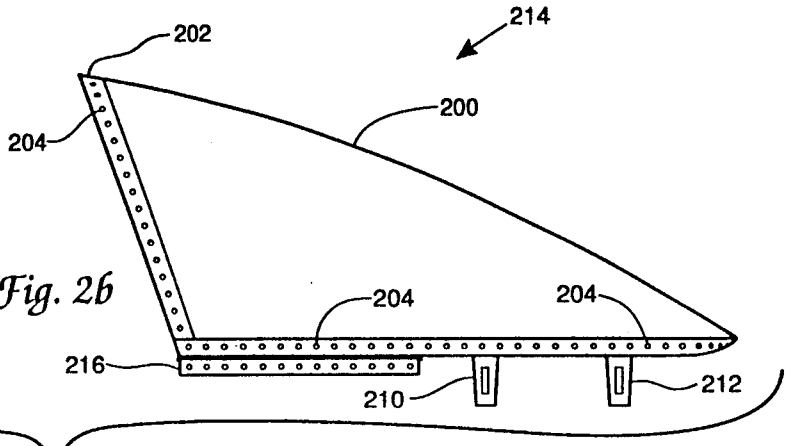
Fig. 2b
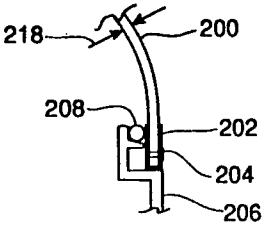
Fig. 2a
Fig. 2

| MISSION PHASE | COMBAT SITUATION | | | TIME OF DAY | | | VISIBILITY & WEATHER | | SIGNATURE REDUCTION | | BALLISTIC IMPACT | | | OTHER THREATS | | | | | | BIRD STRIKE RESISTANCE | | | | OPTICS | | | | |
|---|---|---|---|---|---|---|---|---|---|---|---|---|---|---|---|---|---|---|---|---|---|---|---|---|---|---|---|---|
| | PEACETIME | WARTIME, LOW TECH ENEMY (GUERRILLA WAR) | WARTIME, HIGH TECH ENEMY | DAYLIGHT | NIGHT | DAWN / DUSK | GOOD | BAD | IR | RCS | SMALL ARMS | FRAGMENTS | 20mm HE | CHEM/BIO AGENTS | LASER | NUC FLASH | NUC RADIATION, FLIGHT | NUC RADIATION, GROUND | DIRECTED ENERGY (PARTICLE BEAM) | 250 KNOTS | 350 KNOTS | 500 KNOTS | MAX ATTAINABLE LOW LEVEL SPEED | LOW HAZE | HIGH LIGHT TRANSMITTANCE | LOW DISTORTION | LOW IMAGE DISPLACEMENT | NO MULTIPLE IMAGES |
| AIR-TO-GROUND vs PROTECTED TARGETS (TRAIN TRUCK CONVOY, FORWARD SUPPLY DUMPS, ECT) | | X | | X | | | X | | 4 | 3 | 1 | 4 | 4 | 4 | 4 | 4 | 4 | 4 | 4 | 3 | 3 | 4 | 4 | 2 | 3 | 2 | 2 | 4 |
| | | X | | | X | | X | | 4 | 3 | 2 | 4 | 4 | 4 | 4 | 4 | 4 | 4 | 4 | 3 | 3 | 4 | 4 | 2 | 1 | 2 | 2 | 1 |
| | | X | | | | X | X | | 4 | 3 | 1 | 4 | 4 | 4 | 4 | 4 | 4 | 4 | 4 | 3 | 3 | 4 | 4 | 1 | 3 | 2 | 2 | 4 |
| | | X | | X | | | | X | 4 | 3 | 1 | 4 | 4 | 4 | 4 | 4 | 4 | 4 | 4 | 3 | 3 | 4 | 4 | 2 | 2 | 2 | 2 | 4 |
| | | X | | | X | | | X | 4 | 3 | 2 | 4 | 4 | 4 | 4 | 4 | 4 | 4 | 4 | 3 | 3 | 4 | 4 | 2 | 1 | 2 | 2 | 1 |
| | | X | | | | X | | X | 4 | 3 | 1 | 4 | 4 | 4 | 4 | 4 | 4 | 4 | 4 | 3 | 3 | 4 | 4 | 1 | 2 | 2 | 2 | 4 |
| AIR-TO-GROUND vs PROTECTED TARGETS (TRAIN TRUCK CONVOY, FORWARD SUPPLY DUMPS, ECT) | | | X | X | | | X | | 3 | 1 | 1 | 1 | 2 | 4 | 2 | 3 | 3 | 4 | 4 | 4 | 4 | 4 | 4 | 2 | 3 | 2 | 2 | 4 |
| | | | X | | X | | X | | 3 | 1 | 2 | 1 | 2 | 4 | 2 | 3 | 3 | 4 | 4 | 4 | 4 | 4 | 4 | 2 | 1 | 2 | 2 | 1 |
| | | | X | | | X | X | | 3 | 1 | 1 | 1 | 2 | 4 | 2 | 3 | 3 | 4 | 4 | 4 | 4 | 4 | 4 | 1 | 3 | 2 | 2 | 4 |
| | | | X | X | | | | X | 3 | 1 | 1 | 1 | 2 | 4 | 2 | 3 | 3 | 4 | 4 | 4 | 4 | 4 | 4 | 2 | 2 | 2 | 2 | 4 |
| | | | X | | X | | | X | 3 | 1 | 2 | 1 | 2 | 4 | 2 | 3 | 3 | 4 | 4 | 4 | 4 | 4 | 4 | 2 | 1 | 2 | 2 | 1 |
| | | | X | | | X | | X | 3 | 1 | 1 | 1 | 2 | 4 | 2 | 3 | 3 | 4 | 4 | 4 | 4 | 4 | 4 | 1 | 2 | 2 | 2 | 4 |

IMPORTANCE: 1. ESSENTIAL 2. VERY DESIRABLE 3. NICE TO HAVE 4. NOT NEEDED

*Fig. 3*

COCKPIT VISION AND PROTECTION APPARATUS

RIGHTS OF THE GOVERNMENT

The invention described herein may be manufactured and used by or for the Government of the United States for all governmental purposes without the payment of any royalty.

BACKGROUND OF THE INVENTION

This invention relates to the field of aircraft cockpit windshield and canopy apparatus of the crew protection affording variety.

The characteristics needed in a military aircraft windshield system are found to depend upon the mission performed by the aircraft. In the design of a present-day military aircraft the windshield system is, in fact, another of the systems which should be specialized in order to optimize the aircraft to its mission. The relatively large and slow speed windshield system of a transport aircraft, the smaller, higher speed windshield system on some fighter aircraft, and large one piece transparencies that combine the windshield and canopy on one fighter aircraft are ready present-day examples of different and specific designs in the windshield art.

In the present state of the aircraft design and materials technologies, moreover, a windshield arrangement suitable for a modern variety of aircraft uses is not technically feasible—in view of the large number of compromises such a design necessarily entails. It is possible, however, with presently available materials to accomplish a windshield system in which the number of design compromises required is greatly limited through the use of selectable and movable windshield panels. In such a system, each selectable panel provides characteristics that are capable of meeting specific threat conditions to be encountered by the aircraft. The present invention is an example of this selection of windshield characteristics to meet anticipated specific threats concept.

The prior patent art includes several examples of aircraft windshield systems that are arranged to meet specific aircraft needs. Included in these prior art windshield arrangements is the two-piece structure of W. E. Fellers et al, disclosed in U.S. Pat. No. 3,361,881, wherein the innermost windshield member also functions as a combining glass for a heads-up display apparatus. Also included is the movable member windshield system of A. G. Kinnerley et al, disclosed in U.S. Pat. No. 3,331,570, in which the aircraft pilot is provided with a limited degree of forward vision during high-speed flight through the use of a movable shielding means; and the cabin enclosure apparatus of W. A. Spivak et al, disclosed in U.S. Pat. No. 3,334,846, in which a dual windshield having inner and outer components is described. Also included in this prior patent art is the theft protecting windshield apparatus of J. T. Webb, disclosed in U.S. Pat. No. 4,299,361; the window panel and sealing arrangement of C. W. G. Hall, disclosed in U.S. Pat. No. 4,645,146; the deflector system of F. E. Jarecki, disclosed in U.S. Pat. No. 3,215,377; and the blast shielding apparatus of F. C. Guill disclosed in U.S. Pat. No. 4,650,137. These prior art windshield systems have not, however, provided a degree of flexibility and the range of characteristics available from the windshield system of the present invention.

SUMMARY OF THE INVENTION

The present invention includes a relatively thin outer windshield member that is supplemented by both a thicker and protection affording inner windshield member and one or more specific threat-oriented selectable protection panels which can be deployed in anticipation of the aircraft encountering a related threat condition.

It is an object of the present invention, therefore, to provide an aircraft windshield system in which two fixed-position windshields are supplemented by additional selectable protection panels.

It is another object of the invention to provide an aircraft windshield system in which plural specific threat protection panels may electively be moved between positions of storage and positions of threat protecting use.

It is another object of the invention to provide an aircraft windshield system that is compatible with the use of a separate heads-up display system in the aircraft.

It is another object of the invention to provide an aircraft windshield system in which the windshield components do not distort the relationship between information received from a heads-up display and information received by direct viewing from the aircraft.

It is another object of the invention to provide an aircraft windshield system in which selectable protection against laser weapon energy, nuclear weapon flash effects, ballistic particles, particle beam effects, microwave energy radiation, bird strikes, and to some degree, chemical warfare agents and biological warfare agents is available.

It is another object of the invention to significantly reduce the life cycle cost of a protective aircraft windshield system.

It is another object of the invention to provide a protective aircraft windshield system in which the disadvantages of poor optics and the attending high accident risk are avoided.

It is another object of the invention to provide an aircraft windshield system which achieves increased wartime survivability without incurring peacetime disadvantages.

Additional objects and features of the invention will be understood from the following description and claims and the accompanying drawings.

These and other objects of the invention are achieved by a protective viewing system for an aircraft cockpit comprising the combination of exterior windshield means including an aircraft surface merged, curved, clear thin outer windshield member disposed in front of the aircraft pilot for transparently closing the cockpit fuselage aperture of said aircraft, heads-up display means located behind said outer windshield member and in front of the pilot for communicating selected avionics data thereto, a thicker impact protection transparent shield member located behind said heads-up display means in front of the pilot for halting the travel of pilot threatening physical objects passing through said thin windshield member into the fuselage, and a retractably mounted first specific threat protecting selectively transparent shield member disposable between the heads-up display means and the impact protection windshield member in a first pilot protection affording use position thereof and disposable in an internal portion of the fuselage in a second storage position thereof.

BRIEF DESCRIPTION OF THE DRAWINGS

FIG. 1 shows an aircraft cockpit provided with a protective windshield system according to the invention.

FIG. 2 shows additional details of a windshield system according to the invention.

FIG. 3 shows partial results of an aircraft windshield system requirements study.

DETAILED DESCRIPTION

Figure 4:
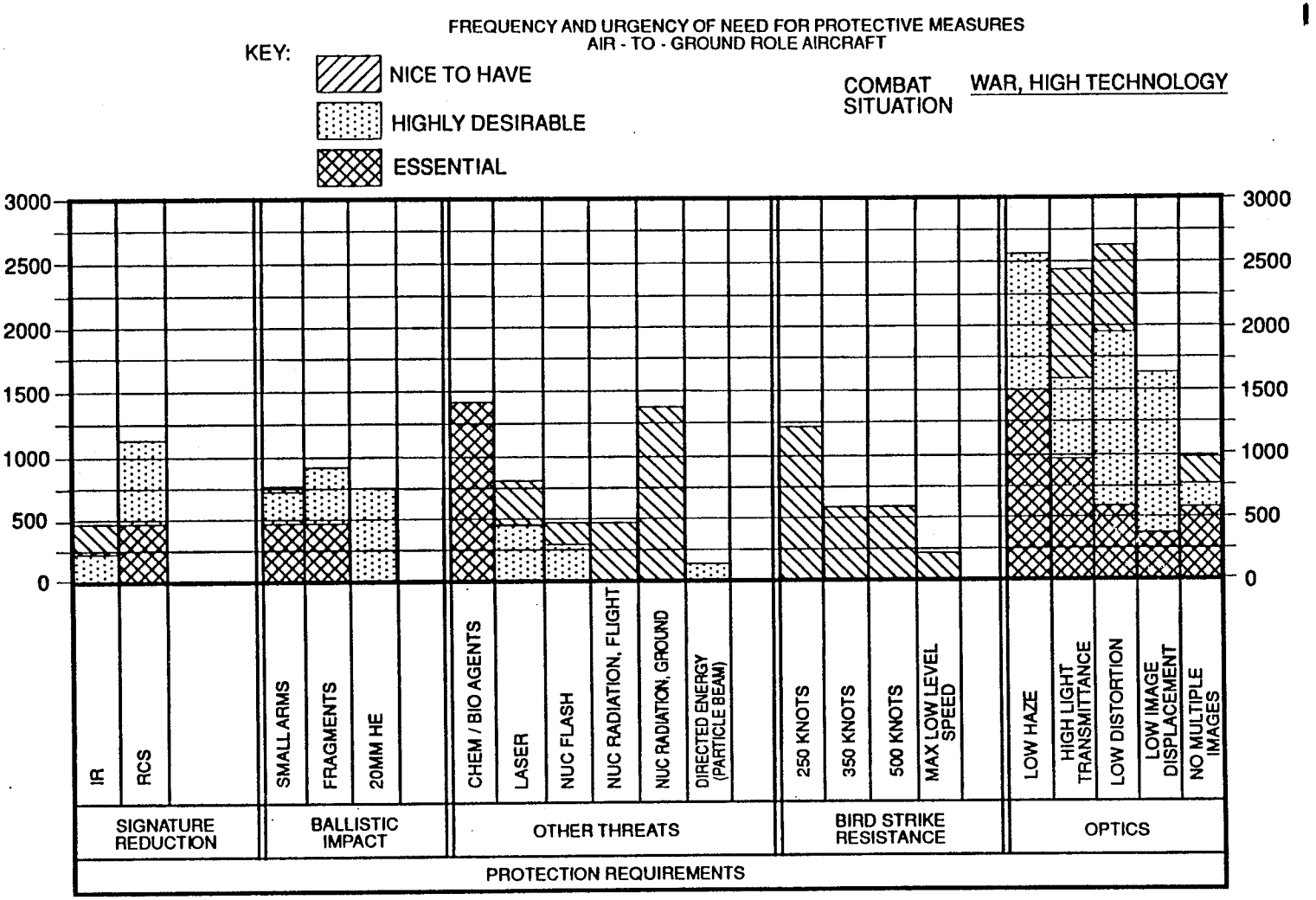
FIG. 4 shows a table of requirements for differing windshield characteristics in one aircraft type.

FIG. 1 in the drawings shows a pseudo cross-sectional portion of a typical fighter aircraft that has been provided with a windshield system or protective viewing system according to the present invention.

In the FIG. 1 drawing, the cockpit portion of the aircraft is indicated at 100, the outer windshield of the aircraft at 102 and the aircraft body at 104. The location of the instrument panel of the aircraft 104 is indicated at 106 in FIG. 1, while a heads-up display unit is indicated at 108, and an inner windshield member is indicated at 110. The contemplated range of positions for the eyes of the pilot in the FIG. 1 aircraft is indicated at 112 and 114 in FIG. 1, these eye positions being typical for a short and relatively thin statured pilot at 111 and for a taller and heavier statured pilot at 113.

Disposed behind the inner windshield member 110 and in front of the heads-up display unit 108 in the FIG. 1 aircraft is the deployed position 115 for a series of movable specific threat protecting panel members 116, 118, and 120 which afford supplemental and electable protection for the pilot and/or other crew members of the FIG. 1 aircraft. An out of use or storage location for the panel members 116, 118, and 120 is shown in dotted line configuration at 122, 124, and 126 in FIG. 1, together with a track mechanism by which the panels are moved between deployed and storage positions by forces originating in an electric motor or other movement apparatus.

In accordance with the present invention, it is contemplated that the outer windshield 102 of the aircraft 104 be made of a relatively thin, lightweight and low cost material which is satisfactory for enclosing the cockpit and isolating it from the aircraft slipstream but which does not provide extensive protection from threats such as bird strikes, ballistic objects such as small arms fire, laser radiation, or nuclear flash protection, for examples. Additionally, in view of the exposure of this outer windshield 102 to weather conditions, abrasive scarring, normal wear and tear usage, and other windshield life shortening environmental conditions, it is contemplated that this outer windshield be easily replaceable and that such replacement be attended by a minimum of materials and labor cost.

To supplement the outer windshield member 102 and provide some of the crew protection functions that are omitted from the windshield 102, the inner windshield member 110 is employed. As illustrated in FIG. 1, it is contemplated that this inner windshield will be fabricated of a thicker material, a material such as laminates of plastic and/or glass, and that it afford significant protection for the aircraft crew from small arms fire, bird strikes, and other ballistic objects which might rupture the outer windshield 102 and perhaps even pass through the heads-up display unit 108. Since the inner windshield 110 is not exposed to the rain, ultra-violet light, abrasive particles and other degrading environmental factors that are operative on the windshield 102, a longer operating life for it is readily achievable. It is also contemplated that the inner windshield 110 be fabricated as a flat planar element having both minimal fabrication cost and maximally desirable optical properties. The inner windshield member 110 may also be provided with a resilient sealing arrangement disposed around its periphery in order that either primary or supplemental sealing of the cockpit 100 from high altitude pressurization leakage and from external contaminants such as chemical and biological warfare agents may be accomplished.

Although the inner windshield 110 is arranged to provide crew protection from ballistic objects including small arms fire and possibly High Explosive (HE) munitions impact, it is contemplated that this windshield be essentially clear and as near optically transparent as is possible. In order to also provide this transparent optical nature with the ability to block energy from a laser weapon or the flash from distant detonation of a nuclear weapon, for examples, it is desirable to supplement the windshield 110 with additional panels which are especially adapted to prevent these forms of energy from reaching the aircraft crew. In the nuclear flash protection art, for example, it is common practice to rely on photochromic materials which undergo a rapid increase in optical density, upon exposure to a high energy flash lamp triggered by the rising wavefront of a nuclear weapon detonation optical pulse. The energy from a laser pulse may also be blocked by one of the panels 116, 118, and 120 in the FIG. 1 aircraft by way of providing appropriate color spectrum properties to the panel and additionally by providing neutral density attenuation of sufficient magnitude to exclude such pulses.

In both of these examples of the capability to be provided in the panels 116, 118, and 120, it may be readily understood that the permanent retention of such optical characteristics in an aircraft windshield would be entirely unsatisfactory for normal use of the aircraft since the views needed for landing or other routine activities would be largely obscured by the high optical densities involved in such protective shields. Additionally, once such shields are triggered or used, they may require extreme periods of time, some form of processing, or replacement in order to return to a normal optical density. Removal and storage of the protective shields is therefore provided in the FIG. 1 aircraft arrangement, together with the provision of a track mechanism by which such removal or storage can be easily accomplished.

In addition to the protection from optical energy threats such as the laser weapon or nuclear weapon detonation flash, panels of the type indicated at 116, 118, and 120 in FIG. 1 may also be provided with the ability to attenuate the effects of particle beam weapons, microwave frequency energy radiation, and possibly even chemical warfare agents and biological warfare agents, the latter involving use of suitable seals to preclude air and vapor communication into the cockpit 100.

During use of the aircraft shown in FIG. 1, it is contemplated that the aircraft crew, upon entering a combat zone or weapons use area will deploy one or more of the panels 116, 118, and 120 according to the threat or threats to be expected in the combat activity. If the aircraft is on an air-to-ground mission involving a nuclear weapon, of course, the nuclear flash protection shield is to be deployed in advance of the target scene. Such deployment can be arranged as a task initiated by the aircraft pilot and accomplished through use of a mechanism somewhat in the nature of an automobile window lifting mechanism or alternately may be arranged for preprogrammed or computer control, or to some degree may be automatically deployed as, for example, upon release of a nuclear weapon from the aircraft.

One aspect of the FIG. 1 aircraft arrangement is particularly to be noted in understanding the present invention. This aspect concerns the relative locations of the inner windshield 110 and the protective panels 116, 118, and 120 with respect to the heads-up display unit 108. Location of these protective components in the FIG. 1 illustrated configuration wherein the aircrew members are called upon to view the heads-up display unit and normal eyesight viewed targets both through the protective windshield components is a desirable arrangement. Except for this dual usage of the protective components, the spatial relationship between a target viewed on the heads-up display and the same target viewed by normal eyesight would be disturbed or distorted by the protective windshield components. In many present-day military aircraft, for example, it is found that replacement of the windshield canopy necessarily includes a recalibration of the heads-up display apparatus in order that undesirable movement between these two target is avoided. The FIG. 1 illustrated relationship of the heads-up display unit 108 and the protective windshield components 110, 116, 118, and 120 also results in locating the heads-up display unit in a position where it may provide additional physical protection for the aircrew.

The arrangement of the invention shown in FIG. 1 may, of course, be altered within the scope or the invention to allow for side-by-side seating of the aircraft crew members, for a differing number of threat protection panels, for a different storage location of the panels within the aircraft, and for differing cockpit and canopy arrangements, including an arrangement wherein all radiant energy entering the cockpit area must pass through the protective apparatus, that is, by exclusion of the overhead portion of the outer windshield 102. The arrangement of the invention as shown in FIG. 1 is especially adapted to utilization in a fighter or other aircraft wherein a single crew member is positioned in front of the heads-up display and the outer windshield 102.

FIG. 2 in the drawings shows in the FIG. 2*b* portion thereof an aircraft windshield arrangement suitable for use in FIG. 1 and in somewhat more detail than is shown for the FIG. 1 windshield. In the FIG. 2 drawing, an outer windshield member is illustrated at 200 and is shown to be bordered by a frame member 202 which may be made of metal or other suitable materials, and which is connected to the windshield 200 by way of a series of rivets 204 or threaded fasteners or other attachment arrangements as are known in the fastening art. The combination of the windshield 200, the frame 202 and the illustrated other portions of the FIG. 2 apparatus may be conveniently referred to as a windshield assembly 214. This windshield assembly further includes the hinge member 216, the windshield locking latches 210 and 212, and the gasket or sealing member which appears in the view of FIG. 2*a*. The relatively thin nature of the outer windshield material 200 in FIG. 2 is indicated by the dimension 218 in FIG. 2*a*, this dimension being contemplated to be in the order of $\frac{1}{3}$ inch to $\frac{1}{2}$ inch in the present invention thin outer windshield member. The surface of the aircraft hosting the outer windshield assembly 214 is shown at 206 in FIG. 2*a* and is shown to be provided with fittings and shapes as may be necessary to accommodate the gasket 208, the hinge 216, and the windshield locking latches 210 and 212. The latches 210 and 212 are preferably disposed on the forward part of the windshield assembly 214 in FIG. 2 with respect to the hinge member 216 in order that the latches provide assembly hold-down on one-side and the hinge provide hold-down on the opposite side. The exterior surface of the aircraft hosting the outer windshield assembly 214 is shown at 206 in FIG. 2*a* and is shown to be provided with formed metal fittings and shapes which may be necessary to engage the gasket 208 and the hinge 216 and the windshield locking latches 210 and 212.

As shown in the FIG. 2*b* drawings the windshield assembly 214 contemplates an opening maneuver involving a left to right motion with respect to a pilot seated within the windshield protected aircraft fuselage, however other opening arrangements including hinges located at the front of the windshield assembly, at the rear top portion of the windshield assembly, or latching arrangements which do not involve a hinge, but allow the windshield to be fully removed from the fuselage can easily be accomplished. Although not shown in the FIG. 2 drawings a heads-up display unit when used may be mounted in the frontal portion of the FIG. 2 windshield assembly and the protective panels as shown at 110, 116, 118 and 120 in FIG. 1 deployed to the rear of this heads-up display unit either within the windshield assembly 214 itself or immediately behind the windshield assembly.

The outer windshield element 200 is, of course, exposed to a full range of weather conditions including extremes of temperature, precipitation, abrasive dust, sun, ultraviolet light, and additionally to the abuses of use and maintenance. For such service, the preferred material for the windshield element is monolithic stretched acrylic, such materials having been found in existing aircraft canopies to be among the best available of the clear and formable plastics. For very high speed aircrafts, however, glass may be required as a result of temperature exposure that exceeds the capabilities of stretched acrylic. It is desirable for the outer windshield assembly 214 in view of its somewhat expendable nature in the present windshield assembly arrangement to be replaceable in a minimum of time. Replacement by way of disassembling the hinge 216 or other quick change arrangements which would allow replacement within the period of 5 to 10 minutes under operating flightline conditions is to be desired and is reasonably accomplished.

Each FIG. 2 windshield assembly has predetermined optical properties which are to be input to the electronics associated with the HUD. The HUD can then compensate automatically for the change inoptical properties between the removed windshield assembly and newly installed windshield assembly. The procedure is similar to procedures presently use with the F-16 aircraft canopy changes and eliminates the need for time consuming bore sight measurement required on other aircraft employing HUFs.

FIG. 3 in the drawings shows the partial results of a study to determine characteristics desired of a windshield system according to such factors as the aircraft mission phase, the encountered combat situation and the experienced environmental conditions by the aircraft. These conditions are identified in the leftmost portions of the FIG. 3 drawing and are precisely indicated by X symbols entered into the table. Windshield characteristics are indicated by numeric values between one and four entered in squares of the right-hand portion of FIG. 3. In this rating scale, the numeral 1 indicates an essential characteristic and the numeral 4 a not needed characteristic, with the values of two and three being intermediate these extremes.

In the FIG. 3 table, for example, an aircraft performing an air-to-ground mission against a defended or protected target such as a convoy, would find ballistic impact resistance, and resistance to small arms fire to be essential while protection against nuclear weapon effects would not be needed and a low distortion view through the windshield would be very desirable. Other examples from the FIG. 3 table may be ascertained by inspection. Additional tables of the FIG. 3 type are to be found in the complete results of the windshield study. These results were disclosed as an informal presentation at the American Society of Testing Materials (ASTM) F7.08 meeting of April 1985 which was held at Phoenix, Ariz. The proceedings of this meeting are hereby incorporated by reference herein. At the Apr. 18, 1985 meeting notes disclosing tables of the FIG. 3 type were made available to meeting attendees. Additional copies of the meeting minutes are available from the ASTM and additional copies of the notes are available from the office of the inventor herein.

A study of the FIG. 3 table together with the similar tables from the ASTM presentation illustrates the difficulty in providing all of the essential and very desirable characteristics of a windshield system using the single windshield arrangement as has been practiced in most aircraft heretofore. The present multiple windshield and selectively usable protection shields offer a viable solution to this limitation of currently available single windshield arrangements.

FIG. 4 in the drawings shows another study results table from the above-referred to ASTM conference and its publications. In FIG. 4 the need for various windshield system characteristics is displayed graphically against needs arising in 600 flights of the hosting aircraft. The FIG. 4 chart is generated for an air-to-ground role aircraft flying a high technology war mission (as opposed to a multi-role fighter or an air defense interceptor aircraft, both of which are described in graphs similar to FIG. 4 in the notes of the ASTM informal presentation).

In FIG. 4 the various windshield characteristics are listed across the figure's lower portion under the major titles of signature reduction (i.e., infrared and radar cross section denoted IR and RCS), ballistic impact, other miscellaneous threats, bird strike resistance and optical characteristics. Although the FIG. 4 data represents 600 aircraft flights, the need occurrences plotted along the vertical edges of FIG. 4 indicate members larger than 600 in view of the multiple need occurrences incurred in many flights—and also in consideration of occurrences of different nature incurred in many flights.

As indicated by particular bar graphs in FIG. 4, threats relating to chemical and biologic agents and nuclear weapon effects are present to a degree requiring consideration in an air-to-ground high technology war aircraft, additionally, significant demands are placed on the optical properties of the windshield system in such an aircraft. The FIG. 4 results also indicate a need for characteristics which cannot be reasonably met by a single windshield structure, as has been used heretofore in aircraft—such as the characteristic represented by the highest graph in each major title. The multiple panel windshield structure of the present invention is, however, significantly more capable of meeting these requirements.

Figure 5:
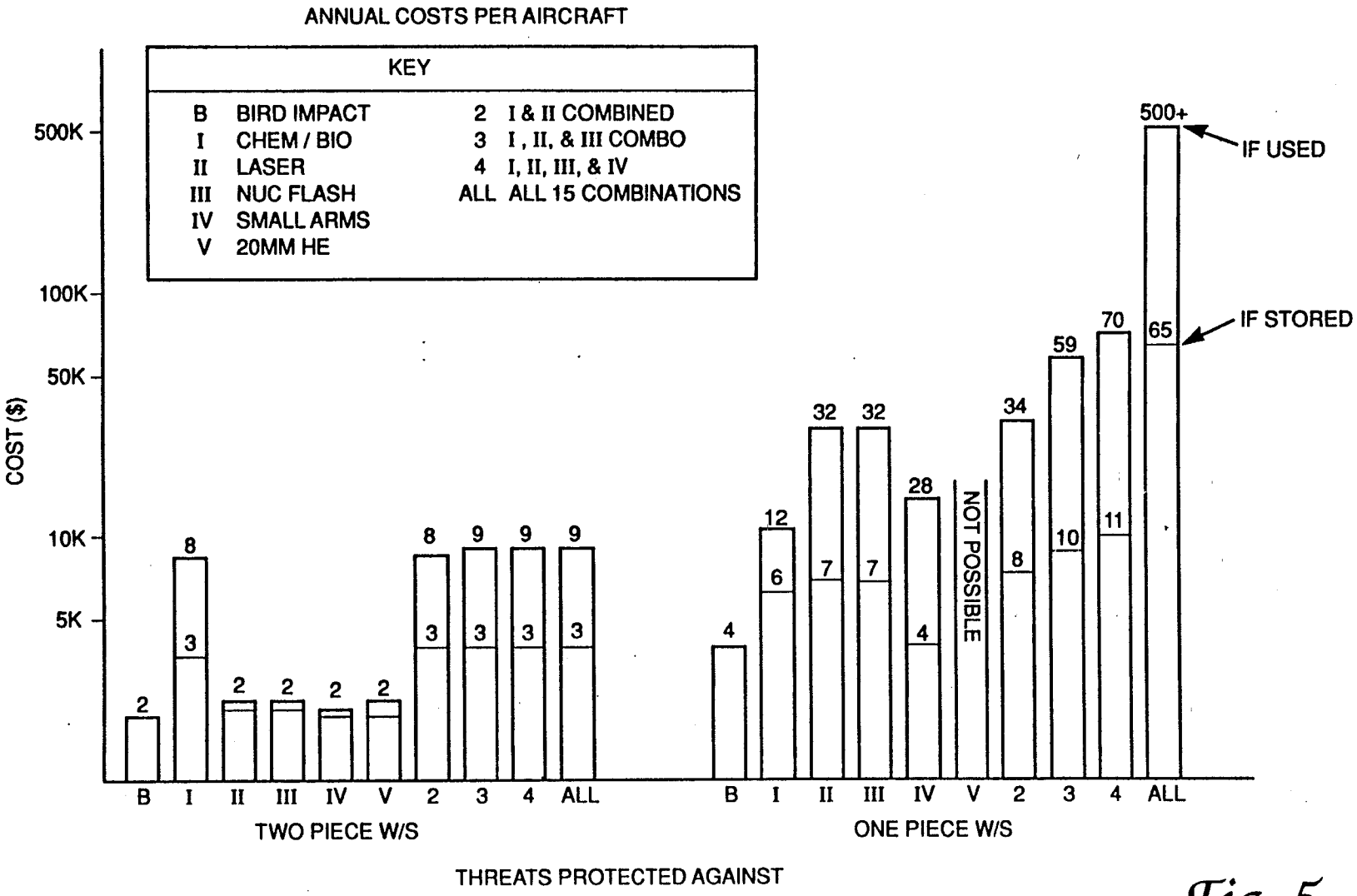
FIG. 5 shows an estimated relationship between windshield system protection and annual cost.

FIG. 5 in the drawings is also typical of information included in the notes of the above referred-to ASTM informal presentation and considers cost factors affecting the selection of a conventional one-piece windshield system. The FIG. 5 data compares the present invention two-piece or multiple-piece windshield system and its protection with a conventional one-piece system and shows the results as a function of annual windshield cost. The cost numbers shown in FIG. 5 include initial cost-spread over an estimated useful life of the windshield system, together with estimated maintenance costs.

A cursory examination of FIG. 5 indicatives the two-piece or multiple-panel windshield arrangement of the present invention is not only significantly lower in cost in comparison with a one-piece windshield arrangement, but also provides capabilities which are not possible with a one-piece arrangement. The difficulty of providing multiple threat protection in a one-piece or conventional windshield system is especially illustrated by the double or greater costs attending such efforts in comparison with the two-piece arrangement of the present invention.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. A protective viewing system for an aircraft cockpit comprising the combination of:

exterior windshield means including an aircraft surface merged, curved, clear thin outer windshield member disposed in front of the aircraft pilot for transparently closing the cockpit fuselage aperture of said aircraft;

heads-up display means located behind said outer windshield member and in front of said pilot for communicating selected avionics data thereto;

a thicker impact protection transparent shield member located intermediate said heads-up display means and said pilot for halting the travel of pilot threatening physical objects passing through said thin windshield member into said fuselage;

a retractably mounted first specific threat protecting selectively transparent shield member disposable between said heads-up display means and said impact protection windshield member in a first pilot protection affording use position thereof and disposable in an internal portion of the aircraft fuselage in a second storage position thereof.

2. The viewing system of claim 1 wherein said selectively transparent shield member is impervious to one of the threats taken from the group comprising a nuclear weapon flash, laser weapon radiant energy, and a ballistic projectile.

3. The viewing system of claim 2 further including an additional one of said retractably mounted specific threat protecting selectively transparent shield members disposable between said heads-up display means and said impact protection windshield member in a first pilot protection affording use position thereof and in an internal portion of said fuselage in a second storage position thereof.

4. The viewing system of claim 3 wherein said selectively transparent shield member is impervious to a second threat taken from the group comprising a nuclear weapon flash laser weapon radiant energy, and a ballistic projectile.

5. The viewing system of claim 4 further including additional of said retractably mounted specific threat protecting shield members.

6. The viewing system of claim 1 wherein said thicker impact protection transparent shield member has a flat planer configuration.

7. The viewing system of claim 1 wherein said selectively transparent shield member second storage position is a position disposed parallel to the longitudinal axis of said aircraft fuselage.

8. The viewing system of claim 1 wherein said exterior windshield means includes pressure sealing means enabling maintenance of a pressurized environment within the interior of said fuselage.

9. The viewing system of claim 1 wherein said retractably mounted first specific threat protecting shield member includes track means for transporting said selectively transparent shield member between said first and second positions.

10. The viewing system of claim 1 wherein said selectively transparent shield member is impervious to two of the threats taken from the group comprising a nuclear weapon flash, laser weapon radiant energy, and a ballistic projectile.

11. The viewing system of claim 1 wherein said selectively transparent shield member includes one of the materials from the group consisting of: a material of selective optical spectrum transparency, and a material of changeable optical density.

12. The viewing system of claim 1 wherein said exterior windshield means includes windshield opening and closing apparatus.

* * * * *